United States Patent [19]

Ueno et al.

[11] 4,127,504
[45] * Nov. 28, 1978

[54] PROCESS FOR THE PRODUCTION OF A CATALYST COMPONENT FOR USE IN THE POLYMERIZATION OF ALPHAOLEFINS

[75] Inventors: Hiroshi Ueno; Naomi Inaba, both of Ooi; Tokuo Makishima, Kawagoe; Shozo Wada, Zushi, all of Japan

[73] Assignee: Toa Nenryo Kogyo Kabushiki Kaisha, Tokyo, Japan

[*] Notice: The portion of the term of this patent subsequent to Dec. 13, 1994, has been disclaimed.

[21] Appl. No.: 744,942

[22] Filed: Nov. 24, 1976

[30] Foreign Application Priority Data

Dec. 8, 1975 [JP] Japan ................................ 50-145165
Nov. 25, 1975 [JP] Japan ................................ 50-140191

[51] Int. Cl.$^2$ ............................................. C08F 4/64
[52] U.S. Cl. .............................. 252/429 B; 526/142; 526/159
[58] Field of Search ............................ 252/429 B, 441

[56] References Cited

U.S. PATENT DOCUMENTS

| 3,769,233 | 10/1973 | Hermans et al. ............ 252/429 B X |
| 3,825,524 | 7/1974 | Wada et al. .................. 252/429 B X |
| 3,862,257 | 1/1975 | Busen et al. ................. 252/429 B X |
| 3,960,765 | 6/1976 | Shiga et al. ...................... 252/429 B |
| 3,984,350 | 10/1976 | Karayannis et al. ............. 252/429 B |
| 4,062,804 | 12/1977 | Veno et al. ....................... 252/429 B |
| 4,064,069 | 12/1977 | Veno et al. ....................... 252/429 B |

Primary Examiner—Patrick Garvin
Attorney, Agent, or Firm—W. T. Clarke; M. B. Kurtzman

[57] ABSTRACT

A process for the production of a catalyst component for use in the polymerization of α-olefins, which comprises reducing titanium tetrachloride with an organo aluminum compound having the general formula Al R$_n$ X$_{3-n}$ wherein R represents a hydrocarbon group having 1 to 18 carbon atoms, x represents a halogen atom and n represents a suitable numeral between $0 < n \leq 3$, to thus obtain a reduced solid, then removing aluminum compounds contained in said reduced solid and activating with a mixture or a complex of titanium tetrachloride and a dialkyl ether of the general formula R'OR" wherein R' and R" are (a) alkyl groups having 1–4 carbon atoms, (b) normal alkyl groups having five carbon atoms, or (c) alkyl groups having 6–20 carbon atoms.

19 Claims, No Drawings

PROCESS FOR THE PRODUCTION OF A CATALYST COMPONENT FOR USE IN THE POLYMERIZATION OF ALPHAOLEFINS

DETAILED EXPLANATION OF THE INVENTION

This invention relates to an improvement in a catalyst component for use in the polymerization of α-olefins (which will hereinafter be referred to as "catalyst component") and more particularly, to a process for the production of a catalyst component capable of producing polymer of narrow particle size distribution whereby in the stereoregular polymerization of α-olefins such as propylene, in particular, not only the stereoregularity of the product is improved but also the polymerization rate is markedly increased.

As a method of producing a crystalline polyolefin on a commercial scale, it has been widely known to use a polymerization catalyst comprising, in combination, a catalyst component consisting of a low valence transition metal halide, and an organo metal halide compound. In particular, a titanium trichloride composition has been used as the low valence metal halide.

A known method of preparing a titanium trichloride composition consists in reducing titanium tetrachloride by metallic aluminum at a high temperature and then grinding the product for activation. The catalyst component prepared in this way is ordinarily called Grade AA titanium trichloride, which contains, in addition to titanium trichloride, aluminum chloride in an eutectic form. When this product is used as a polymerization catalyst, the rate of polymerization and the stereoregularity of the product are unsatisfactory. For commercial scale operation, a large amount of expensive catalyst is necessary and treatment of noncrystalline polymers produced as byproduct involves substantial costs.

Many efforts have been made to overcome these disadvantages. For example, some of the catalytic components have been removed to improve somewhat the polymerization rate or product stereoregularity by extracting with a solvent (Soga et al.: "Shokubai (Catalysts)" Vol. 11, page 75 (1969)), reacting with an ether compound followed by washing (Japanese Patent Publication No. 3356/1978, published Feb. 6, 1978 with various materials followed by solvent extraction (Japanese Patent Publication No. 26376/1972). In these methods, however, the particle size distribution of the catalytic component has not been sufficiently reduced, so that a polymer obtained using this catalyst component may also have a wide particle size distribution, resulting in trouble in handling this polymer powder.

Another known method of preparing a titanium trichloride composition consists in reducing titanium tetrachloride with diethylaluminum chloride in a proportion substantially equimolar or less to the titanium atom present at low temperature, as disclosed in, for example, Japanese Patent Publication Nos. 10415/1971, 21575/1972 and 11807/1972. This method has the advantage that a catalytic component with a relatively even particle size can be obtained, but, on the other hand, the titanium trichloride composition obtained by this method is a brown β-type titanium trichloride composition which has inferior polymerization capacity. Therefore, it is necessary to subject this composition to a heat activation treatment to convert it to a violet titanium trichloride composition. However, when this product is used as a polymerization catalyst. The polymerization rate and the stereoregularity of the product are not superior to those obtained when the above described Grade AA titanium trichloride is used. The alkylaluminum dihalide byproduct of the reduction in the above described method is regarded as a harmful material to the catalytic component and, as described in the above publications, for example, Japanese Patent Publication No. 10415/1971, therefore, it is recommended to treat it with a complexing agent such as an ether compound. Even if this treatment is carried out when the reduced solid is subjected to a heating and activating treatment, the catalytic activity of the resulting component is deficient.

As a further method of preparing a titanium trichloride composition, it has been proposed to obtain a catalyst component capable of giving a relatively high polymerization rate, high stereoregularity and excellent particle size distribution by reducing titanium tetrachloride by diethylaluminum chloride at a low temperature to form a β-type titanium trichloride composition and then to treat it with a complexing agent and titanium tetrachloride to convert it into a violet δ-type catalyst solid. However, this method has the disadvantage that when using a complexing agent other than diisoamyl ether, the titanium trichloride composition is not substantially improved. Also it is necessary to use a reagent having a concentration of 15% by volume or more, preferably 30 to 40% by volume when treating titanium tetrachloride. Since diisoamyl ether is an expensive reagent which is 10 to 20 times more expensive than other organic ether compounds or about 10 times more expensive than the product marketed as Grade AA titanium trichloride, the above described method has the disadvantage that the production cost of the catalyst component on a commercial scale is high even though the product exhibits excellent properties as a catalyst.

The present invention, which overcomes the various disadvantages of the known process, provides a method for producing catalyst components for use in the polymerization of α-olefins, having excellent polymerization activity, and capable of producing polymer high in stereoregularity and narrow in particle size distribution, by reducing titanium tetrachloride with an organo aluminum compound, removing aluminum compounds contained in the resulting reduced solid by any suitable method and then treating this solid with a mixture or complex of titanium tetrachloride and a dialkyl ether having the formula R'OR" wherein R' and R" are the same or different and each selected from the group consisting of (a) alkyl groups having 1 to 4 carbon atoms, (b) normal alkyl groups having 5 carbon atoms, and (c) alkyl groups having 6 to 20 carbon atoms.

Thus, the present invention provides a process for the production of a catalyst component for use in the polymerization of α-olefins, which comprises reducing titanium tetrachloride with an organo aluminum compound or mixture of such compounds having the general formula $AlR_nX_{3-n}$ wherein R represents a hydrocarbon group having 1 to 18 carbon atoms, X represents a halogen atom and n represents a number expressed as $0 < n \leq 3$, to thus obtain a reduced solid, then removing aluminum compounds contained in the reduced solid and activating with a mixture or complex of titanium tetrachloride and a dialkyl ether having the formula R'OR" wherein R' and R" are the same or different and each selected from the group consisting of (a) alkyl groups having 1 to 4 carbon atoms, (b) normal alkyl groups having 5 carbon atoms, and (c) alkyl groups having 6 to 20 carbon atoms.

It is a feature of the present invention that aluminum compounds contained in the reduced solid are removed and then the reduced solid is subjected to an activation treatment using a particular complex or mixture as described above. Even in the combination of the prior art methods, that is, for removing aluminum compounds with a heating and activating treatment, the catalyst component obtained is not improved much, whilst according to the present invention, a great advantage is obtained by the use of a small amount of a complex or mixture of a dialkyl ether as described hereinafter and titanium tetrachloride.

It is another feature of the present invention that the method of removing aluminum compounds contained in the reduced solid is not limited to treatment with a specific complexing agent, but that any of several methods can effectively be used. The prior art method has hitherto succeeded in obtaining a relatively large improvement by the combination of the method of removing aluminum compounds comprising treating the reduced solid with a complexing agent followed by an activation treatment with titanium tetrachloride, but, on the other hand, it has the disadvantage that a large improvement cannot be obtained when another complexing agent than diisoamyl ether is used. In fact, according to our experiments, the improvement is very unsatisfactory even when the reduced solid is treated with, for example, di-n-butyl ether and then activated by titanium tetrachloride only, as shown in the following Comparative Examples.

According to the present invention, on the contrary, the removal of aluminum compounds can be carried out not only by the use of a specific compound such as diisoamyl ether but also by the application of other known techniques, so long as the activation is carried out using a complex or mixture of titanium tetrachloride and as hereinafter described dialkyl ether.

It is very difficult to explain why a complex or mixture of titanium tetrachloride and said dialkyl ether has a particular action in the final processing step of the catalyst component in the present invention, but it is true that there is a difference as to the object of using such a dialkyl ether between the present invention and the above described known method, since the quantity of dialkyl ether used in the former is small while the quantity of diisoamyl ether used in the latter is very large, that is, 0.8 to 1 mol per 1 mol of titanium. This is possibly due to the fact that the said dialkyl ether is used for the particular activation action in the present invention, while diisoamyl ether is used for the purpose of removing aluminum compounds present in a large quantity in the known method.

The catalyst component produced by the process of the invention having the above described features is excellent in activity and produces polymer having a narrow particle size distribution as is apparent from the following Examples, and furthermore, the process of the invention is economical because diisoamyl ether is not used at all.

The reducing reaction of the invention is carried out by contacting titanium tetrachloride with a reducing agent represented by the general formula $AlR_nX_{3-n}$ in an inert diluent. In this formula, R represents a hydrocarbon group having 1 to 18 carbon atoms, preferably 1 to 12 carbon atoms, more preferably, an alkyl group having 2 to 6 carbon atoms; X represents a halogen atom selected from fluorine, chlorine, bromine and iodine, chlorine being used with best results; and n represents a suitable number expressed as $0 < n \leq 3$, preferably $1 < n \leq 2.5$.

As diluents for the reducing reaction, $C_4$ to $C_{12}$ aliphatic hydrocarbons substantially free of aromatic hydrocarbons or alicyclic hydrocarbons may be mentioned. The temperature of the reducing reaction is relatively important for the properties of the final product and should be adjusted within a range of $-50°$ to $+30°$ C. The reaction is begun by contacting titanium tetrachloride with the reducing agent while agitating the mixture, resulting in deposition of the reduced solid, insoluble in the inert diluent. Contacting is carried out by adding dropwise either a solution of titanium tetrachloride or a solution of reducing agent to the other. All the solutions are preferably mixed for 1 hour or more, in particular, 3 hours or more, during which time the reaction system should be kept at the above described temperature. It is desirable to control the concentration of the reagent throughout the reaction time so that the slurry concentration of the resulting titanium trichloride may be 150 to 800 g/l, preferably 300 to 500 g/l. After both the solutions are completely mixed, the mixture is kept at the same temperature for at least 10 minutes, preferably, 1 hour or more, then gradually heated and kept for 15 minutes or more at a constant temperature between 20° and 120°, preferably 60° and 100° C. with continuous agitation. The reduced solid obtained in this way should be thoroughly washed with a fresh solvent.

The aluminum compounds contained in the thus resulting reduced solid can be removed by known techniques, for example, subjecting the solid to a high vacuum to sublimate the aluminum compounds or by treating the reduced solid with a compound capable of forming a complex compound with the aluminum compounds (i.e., complexing agent) and then extracting with a solvent. As the complexing agent (generally a Lewis base), there are used, for example, ethers, thioethers, thiols, organo phosphorus compounds, organo nitrogen compounds, ketones or esters.

Examples of ether complexing agents are diethyl ether, diisopropyl ether, di-n-butyl ether, diisobutyl ether, di-2-ethylhexyl ether, di-2-ethylheptyl ether, allyl ethyl ether, allyl butyl ether, anisole phenetole, chloroanisole, bromoanisole and dimethoxybenzene.

Examples of thioether complexing agents are diethyl thioether, di-n-propyl thioether, dicyclohexyl thioether, diphenol thioether, ditolyl thioether, ethyl phenyl thioether, propyl phenyl thioether and diallyl thioether.

Examples of the organo phosphorus complexing agents are tri-n-butylphosphine, triphenylphosphine, triethyl phosphite and tributyl phosphite. Examples of the organo nitrogen compounds are diethylamine, triethylamine, n-propylamine, di-n-propylamine, tri-n-propylamine and dimethylaniline.

Ethers, in particular, having 4 to 16 carbon atoms are preferable as complexing agents. The extraction can be carried out by any known methods, for example, by stirring the reduced solid with an ether compound in an inert medium and separating into a liquid phase and solid phase. Such a medium may be the same as that used in the reducing reaction. The extraction is ordinarily carried out at a constant temperature between 0° and 80° C. for 5 minutes or more, for example, 30 minutes to 2 hours. The quantity of complexing agent used is ordinarily 0.1 to 2.5 mols, preferably 0.4 to 1.0 mol per 1 mol of titanium atom in the reduced solid.

The solid obtained by the above described treatment is then subjected to an activation treatment with a complex consisting of a dialkyl ether as hereinafter described and titanium tetrachloride or a mixture of such dialkyl ether and titanium tetrachloride. Preparation of such a complex consisting of the said dialkyl ether and titanium tetrachloride can be carried out by contacting both the compounds in equimolar amounts as it is or in a hydrocarbon solvent at room temperature or with heating. This complex is a crystal, complex compound of equimolar dialkyl ether and titanium tetrachloride, which can be confirmed by analysis after purification, for example, by recrystallization using a hydrocarbon solvent. In the activation treatment with a complex according to the present invention, the thus prepared complex is used. The treatment of the solid with a mixture of the dialkyl ether and titanium tetrachloride can be carried out by mixing the solid with dialkyl ether and titanium tetrachloride, but it is preferable to mix both previously before use thereof. The quantity of dialkyl ether used in the activation treatment should be 0.1 mol or more per 1 mol of titanium trichloride in the solid whether the complex or mixture is used. If less than this range of ether is used, the resulting catalyst component is unsatisfactory in regard to polymerization activity and stereoregularity of the product polymer. If more ether is used, the particle size distribution of the catalyst component treated is broadened resulting in an increase of the proportion of fine powder in the product, in addition to poor economics of the process, i.e. use of an excess of an expensive reagent. Therefore, in fact, the quantity of dialkyl ether is preferably 0.1 to 2.0 mol per 1 mol of titanium trichloride. On the other hand, the quantity of titanium tetrachloride is so adjusted that the concentration thereof may be 1% by volume or more, preferably, 5% by volume or more of the whole liquid phase throughout the treatment. This activation treatment is carried out using a hydrocarbon solvent such as pentane, hexane, heptane, octane, cyclohexane, cyclopentane, etc. in such a manner that the solid concentration in the treating system be 50 to 800 g/l, preferably, 200 to 600 g/l. The temperature of the activation treatment is ordinarily within a range of −30° to 100° C., preferably 40° to 80° C., and the time required for the activation is sufficiently 30 minutes but should be 1 to 3 hours for best results. Then the thus treated solid should be thoroughly washed with the hydrocarbon solvent used in the above described treatment.

The dialkyl ether used in this invention is represented by the general formula R'OR" wherein R' and R" are the same or different and are each selected from (a) alkyl groups having 1 to 4 carbon atoms, (b) normal alkyl groups of five carbon atoms, and (c) alkyl groups having 6 to 20 carbon atoms. Preferably R' and R" have 3 to 12 carbon atoms.

Examples of dialkyl ethers are di-n-propyl ether, diisopropyl ether, di-n-butyl ether, diisobutyl ether, isobutyl-n-butyl ether, di-n-amyl ether, di-n-hexyl ether, di-n-heptyl ether, diisoheptyl ether, di-2-ethylhexyl ether, di-n-dodecyl ether, n-butyl-2-ethylhexyl ether and isobutyl-2-ethylhexyl ether. Mixtures of one or more of the above described ethers can also be used.

The thus obtained catalyst component is used together with a cocatalyst component for the polymerization of alpha olefins. As the co-catalyst, organometallic compounds of Group I, II and III elements of the Periodic Table are used. In particular, organic aluminum compounds are preferably used and, above all, triethylaluminum and diethylaluminum chloride are most suitable for the polymerization of propylene. Any polymerization methods known in the art can be used. For example, a liquid monomer may be used as the polymerization medium without using a polymerization diluent or a gaseous monomer may be used similarly.

The present invention will be illustrated in detail by the following Examples.

EXAMPLE 1

700 ml of purified heptane and 250 ml of titanium tetrachloride were charged in a 2000 ml flask equipped with a stirrer and kept at 0° C. in a bath. 315 ml of diethylaluminum chloride (1.1 mol to 1 mol of titanium tetrachloride) was dissolved in 400 ml of heptane and added dropwise from a dropping funnel. The dropping was continued for a period of about 3 hours and, during the same time, the reaction system was kept at 0° C. After the dropwise addition, the reaction mixture was gradually heated for 1 hour to 65° C. with agitation. The reaction was further continued at the same temperature for another 1 hour. After completion of the reaction, the reaction mixture was allowed to stand to separate the solid formed and the solid was washed three times with 700 ml of purified heptane, followed by drying at 65° C. for 30 minutes under reduced pressure. The thus reduced solid was black brown and, according to X-ray diffraction, there was contained therein a large quantity of β-type crystal. The particle size distribution was very narrow and there was 1% or less of fine particles of 5 microns or less. The molar Al/Ti ratio in the reduced solid was 0.43.

150 g of the reduced solid was suspended in 1850 ml of purified heptane, to which 127 ml (equimolar to the titanium in the reduced solid) of di-n-butyl ether (referred hereinafter to as "NBE") was dropwise added for 10 minutes with agitation at room temperature, and the mixture was reacted at 35° C. for 1 hour. After the reaction, the reduced solid was washed three times with 500 ml of purified heptane to remove aluminum compounds present in the solid, followed by drying at 65° C. for 30 minutes under reduced pressure.

30 g of the resulting solid, from which the aluminum compounds had substantially been removed by the above described treatment, were again suspended in 53 ml of purified heptane, to which 47.6 ml of a heptane solution of an equimolar complex of titanium tetrachloride and di-n-amyl ether (referred hereinafter to as "NAE"), adjusted previously to a concentration of 2 mols/l, was added, and the mixture was reacted at 65° C. for 2 hours. The molar ratio of NAE to titanium trichloride was 0.6 and the proportion of titanium tetrachloride in the whole liquid phase was 10% by volume. After the reaction, the solid was washed three times with 100 ml of purified heptane, followed by drying at 65° C. for 30 minutes under reduced pressure.

The catalyst solid obtained in this way also had a narrow particle size distribution and there was only 3% of fine powder of 5 microns or less size. The molar Al/Ti ratio in the solid was 0.020.

100 mg of the catalyst solid was charged in an autoclave of 1000 ml, to which 180 mg of diethylaluminum chloride as co-catalyst, 600 ml (Standard State) of hydrogen as a molecular weight regulator and 800 ml of liquid propylene were added.

The polymerization was carried out at a temperature of 68° C. for 30 minutes and the unreacted propylene was removed by flashing, thus obtaining 143 g of polypropylene powder. Thus the polymer yield per 1 g of the catalyst solid (catalyst efficiency, referred hereinafter to as "E") was 1430. This polymer had a melt flow rate of 3.8 (Melt Flow Rate — ASTM D 1238 — referred to as "MFR") and a heptane-insoluble content of 97% (referred hereinafter to as "HI") which was measured by extracting with heptane for 5 hours by means of a Soxhlet extractor.

The results are shown in Table I.

COMPARATIVE EXAMPLE 1

The procedure of Example 1 was repeated except that the activation treatment with the complex consisting of titanium tetrachloride and NAE was not carried out and the polymerization test was immediately carried out, whereby results as shown in Table I were obtained.

It is apparent from these results that the activation treatment with the complex is essential.

COMPARATIVE EXAMPLE 2

The procedure of Example 1 was repeated except that the activation treatment with the complex consisting of titanium tetrachloride and NAE was not carried out and instead a heating and activating treatment was carried out at 150° C. for 1 hour, thereby obtaining results as shown in Table I.

It is apparent from these results that a marked improvement cannot be expected by an activation treatment by heating even after removing aluminum compounds.

COMPARATIVE EXAMPLE 3

The procedure of Example 1 was repeated except that, in place of the activation treatment with the complex consisting of titanium tetrachloride and NAE, an activation treatment with titanium tetrachloride having the same concentration was carried out, thereby obtaining results as shown in Table I.

It is apparent from these results that a marked improvement cannot be expected by activating with titanium tetrachloride alone even after aluminum compounds are removed and it is thus essential to add NAE at the time of treatment with titanium tetrachloride.

COMPARATIVE EXAMPLE 4

The procedure of Comparative Example 3 was repeated except that in place of the NBE treatment, a treatment with equimolar NAE to titanium trichloride was carried, thereby obtaining results as shown in Table I. Both activity and particle character were inferior to those obtained by means of this invention. It is apparent from these results that the use of NAE at the time of treatment with titanium tetrachloride is very effective for the activation.

COMPARATIVE EXAMPLE 5

Using titanium trichloride of Grade AA manufactured by Toyo Stauffer Co. a polymerization test as in Example 1 was carried out, obtaining results as shown in Table I.

Table I

|  | Example 1 | Comparative Example 1 | Comparative Example 2 | Comparative Example 3 | Comparative Example 4 | Comparative Example 5 |
|---|---|---|---|---|---|---|
| NAE/TiCl$_3$ (Molar Ratio) | 0.6 | — | — | — | — | AA Grade |
| Quantity of TiCl$_4$ in Whole Liquid Phase (Vol %) | 10 | — | — | 10 | 10 |  |
| Al/Ti (Molar Ratio) | 0.020 | 0.08 | 0.08 | 0.018 | 0.019 | 0.335 |
| Quantity of Particles of 5μ or less size in Catalyst Solid (%) | 3 | 2 | 2 | 2 | 19 | 12 |
| E | 1430 | 590 | 310 | 890 | 400 | 410 |
| HI | 97 | 58 | 85 | 95 | 94 | 92 |
| MFR | 3.8 | 9.6 | 6.3 | 5.9 | 3.8 | 4.9 |

EXAMPLES 2 TO 4

The procedure of Example 1 was repeated except the quantity of the equimolar complex of NAE and titanium tetrachloride was varied, obtaining results as shown in Table II.

EXAMPLE 5

The procedure of Example 1 was repeated except that in place of the complex consisting of titanium tetrachloride and NAE, titanium tetrachloride and NAE were separately added to the processed solid to activate it, obtaining results shown in Table II.

TABLE II

|  | Example 2 | Example 3 | Example 4 | Example 5 |
|---|---|---|---|---|
| NAE/TiCl$_3$ (Molar Ratio) | 0.1 | 0.3 | 2.4 | 0.6 |
| Quantity of TiCl$_4$ in Whole Liquid Phase (Vol %) | 1.5 | 5 | 40 | 10 |
| Al/Ti (Molar Ratio) | 0.021 | 0.018 | 0.010 | 0.017 |
| Quantity of Particles of 5μ or less size in Catalyst Solid (%) | 2 | 2 | 13 | 3 |
| E | 1010 | 1150 | 1680 | 1420 |
| HI | 89 | 93 | 97 | 95 |
| MFR | 6.3 | 4.2 | 5.8 | 5.1 |

EXAMPLES 6 TO 13

The procedure of Example 1 was repeated except that mixtures of NAE and titanium tetrachloride in various proportions, previously prepared, were used in place of the complex consisting of titanium tetrachloride and NAE, thereby obtaining results as shown in Table III.

Table III

| | Example 6 | 7 | 8 | 9 | 10 | 11 | 12 | 13 |
|---|---|---|---|---|---|---|---|---|
| NAE/TiCl$_3$ (Molar Ratio) | 0.1 | 0.3 | 1.0 | 0.6 | 0.1 | 0.3 | 0.6 | 1.0 |
| Quantity of TiCl$_4$ in Whole Liquid Phase (Vol %) | 10 | 10 | 10 | 25 | 40 | 40 | 40 | 40 |
| Al/Ti (Molar Ratio) | 0.018 | 0.017 | 0.021 | 0.011 | 0.014 | 0.016 | 0.020 | 0.010 |
| Quantity of Particles of 5μ or less size in Catalyst Solid (%) | 2 | 2 | 4 | 4 | 4 | 8 | 14 | 6 |
| E | 1100 | 1310 | 1200 | 1480 | 1290 | 1410 | 1500 | 1510 |
| HI | 96 | 96 | 96 | 97 | 97 | 97 | 97 | 96 |
| MFR | 3.5 | 4.9 | 4.6 | 5.3 | 5.2 | 6.3 | 3.8 | 4.9 |

EXAMPLES 14 TO 22

The procedure of Example 1 was repeated except that in place of NAE, di-n-heptyl ether (referred hereinafter to as "NHE") was used with titanium tetrachloride, thereby obtaining results as shown in Table IV. It is apparent from these results that the use of NHE is effective for the activation in the same manner as NAE.

COMPARATIVE EXAMPLE 6

The procedure of Comparative Example 4 was repeated except using NHE in place of NAE, thereby obtaining results as shown in Table IV. It is apparent from these results that the use of NHE at the time of treatment with titanium tetrachloride is effective for the activation.

EXAMPLES 29 and 30

The procedure of Example 14 was repeated except that diisobutyl ether or diisoamylether was used for removing aluminum compounds in the reduced solid in place of NBE, whereby results as shown in Table VI were obtained.

Table VI

| | Example 29 | 30 |
|---|---|---|
| Complexing Agent | IBE | IAE |
| NHE/TiCl$_3$ (Molar Ratio) | 0.6 | 0.6 |
| Quantity of TiCl$_4$ in Whole Liquid Phase (% by Volume) | 10 | 10 |
| Al/Ti (Molar Ratio) | 0.019 | 0.018 |
| Quantity of Particles of 5μ or less size in Catalyst Solid (%) | 3 | 3 |
| E | 1490 | 1520 |
| HI | 97 | 97 |
| MFR | 3.8 | 5.0 |

Table IV

| | Example 14 | 15 | 16 | 17 | 18 | 19 | 20 | 21 | 22 | Comparative Example 6 |
|---|---|---|---|---|---|---|---|---|---|---|
| NHE/TiCl$_3$ (Molar Ratio) | 0.6 | 0.1 | 0.3 | 1.0 | 0.6 | 0.1 | 0.3 | 0.6 | 1.0 | — |
| Quantity of TiCl$_4$ in Whole Liquid Phase (Vol %) | 10 | 10 | 10 | 10 | 25 | 40 | 40 | 40 | 40 | 10 |
| Al/Ti (Molar Ratio) | 0.019 | 0.019 | 0.018 | 0.020 | 0.013 | 0.017 | 0.011 | 0.021 | 0.018 | 0.016 |
| Quantity of Particles of 5μ or less size in Catalyst Solid (%) | 3 | 2 | 2 | 4 | 4 | 4 | 8 | 12 | 8 | 18 |
| E | 1500 | 1120 | 1290 | 1050 | 1510 | 1080 | 1490 | 1490 | 1480 | 290 |
| HI | 97 | 96 | 96 | 96 | 97 | 97 | 97 | 97 | 96 | 92 |
| MFR | 4.8 | 5.8 | 7.1 | 4.9 | 5.0 | 3.8 | 3.9 | 4.1 | 7.0 | 2.8 |

EXAMPLES 23 TO 28

The procedure of Example 1 or Example 14 was repeated except that the quantity of dialkyl ether used was varied whereby results as shown in Table V were obtained. It is evident from these results that effect variation of the quantity of dialkyl ether for removing aluminum compounds is not large within the range examined.

Table V

| | Example 23 | 24 | 25 | 26 | 27 | 28 |
|---|---|---|---|---|---|---|
| NBE/TiCl$_3$ (Molar Ratio) | 0.5 | 0.8 | 1.5 | 0.5 | 0.8 | 1.5 |
| NAE/TiCl$_3$ (Molar Ratio) | 0.6 | 0.6 | 0.6 | — | — | — |
| NHE/TiCl$_3$ (Molar Ratio) | — | — | — | 0.6 | 0.6 | 0.6 |
| Quantity of TiCl$_4$ in Whole Liquid Phase (Vol %) | 10 | 10 | 10 | 10 | 10 | 10 |
| Al/Ti (Molar Ratio) | 0.019 | 0.013 | 0.017 | 0.020 | 0.016 | 0.015 |
| Quantity of Particles of 5μ or less size in Catalyst Solid (%) | 2 | 3 | 3 | 2 | 3 | 5 |
| E | 1510 | 1390 | 1480 | 1380 | 1500 | 1490 |
| HI | 97 | 97 | 97 | 97 | 97 | 97 |
| MFR | 7.0 | 6.8 | 4.3 | 6.0 | 5.8 | 6.3 |

What is claimed is:

1. A process for the production of a catalyst component for use in the polymerization of α-olefins which comprises reducing titanium tetrachloride at a temperature of from −50° to +30° C. with an organoaluminum compound or mixture of such compounds having the general formula AlR$_n$X$_{3-n}$ wherein R represents a hydrocarbon group having 1 to 18 carbon atoms, X represents a halogen atom and n represents a number expressed as $0 < n \leq 3$, to obtain a brown or black-brown titanium trichloride reduced solid containing aluminum compounds, removing aluminum compounds contained in said reduced solid, and thereafter contacting said reduced solid in an inert diluent and at a temperature within the range of from $-30°$ to $100°$ C. for at least 30 minutes with an activator which is a complex or mixture of titanium tetrachloride and a dialkyl ether wherein the mole ratio of dialkyl ether to titanium tetrachloride is at least 0.1 and the concentration of titanium tetrachloride is maintained at at least 1 volume percent of the liquid phase, said dialkyl ether having the formula R'OR", in which R' and R" are the same or different and each are selected from the group consisting of (a) alkyl groups having 1 to 4 carbon atoms, (b) normal alkyl groups having 5 carbon atoms, and (c) alkyl groups having 6–20 carbon atoms.

2. A process according to claim 1, wherein the organoaluminum compound is diethyl aluminum chloride.

3. A process according to claim 1, wherein the organoaluminum compound is ethyl aluminum dichloride.

4. A process according to claim 1, wherein the reduction of titanium tetrachloride is effected at a temperature of $-50°$ to $+30°$ C. and thereafter the temperature of the reaction mixture is raised to $20°$ to $120°$ C.

5. A process according to claim 1, wherein the aluminum compounds are removed by complexing with an ether and then extracting the ehter complex of the aluminum compounds with a solvent.

6. A process according to claim 5, wherein the ether complexing agent is selected from the group consisting of diethyl ether, diisopropyl ether, di-n-butyl ether, di-isobutyl ether, diisoamyl ether, di-2-ethylhexyl ether, di-2-ethylheptyl ether, allyl ethyl ether, allyl butyl ether, anisole, phenetole, chloroanisole, bromoanisole and dimethoxybenzene.

7. A process according to claim 1, wherein the alkyl ether employed in mixture or complexed with titanium tetrachloride is an alkyl ether selected from the group consisting of di-n-propyl ether, diisopropyl ether, di-n-butyl ether, diisobutyl ether, isobutyl-n-butyl ether, di-n-amyl ether, di-n-hexyl ether, di-n-heptyl ether, diisoheptyl ether, di-2-ethylhexyl ether, di-n-dodecyl ether, n-butyl-2-ethylhexyl ether, and isobutyl-2-ethylhexyl ether and mixtures thereof.

8. A process according to claim 7, wherein the alkyl ether is di-n-amyl ether.

9. A process according to claim 2, wherein the mol ratio of the diethyl aluminum chloride to titanium tetrachloride is 1 or more to 1.

10. A process according to claim 3, wherein the mol ratio of ethyl aluminum dichloride to titanium tetrachloride is 0.3 to 1 to 1.2 to 1.

11. The catalyst component produced by the process of claim 1.

12. The catalyst component produced by the process of claim 9.

13. The catalyst component produced by the process of claim 10.

14. The catalyst component produced by the process of claim 4.

15. The catalyst component produced by the process of claim 5.

16. The catalyst component produced by the process of claim 6.

17. The catalyst component produced by the process of claim 7.

18. The catalyst component produced by the process of claim 8.

19. A process according to claim 1, wherein, in said contacting of brown or black-brown titanium trichloride reduced solid in an inert diluent with said activator, the mole ratio of the dialkyl ether to titanium trichloride is within the range of 0.1 to 2.0, the concentration of titanium tetrachloride in the diluent is at least 5 volume percent and the reduced solid concentration in the diluent is at least 50 grams per liter.

* * * * *